Figure 1:
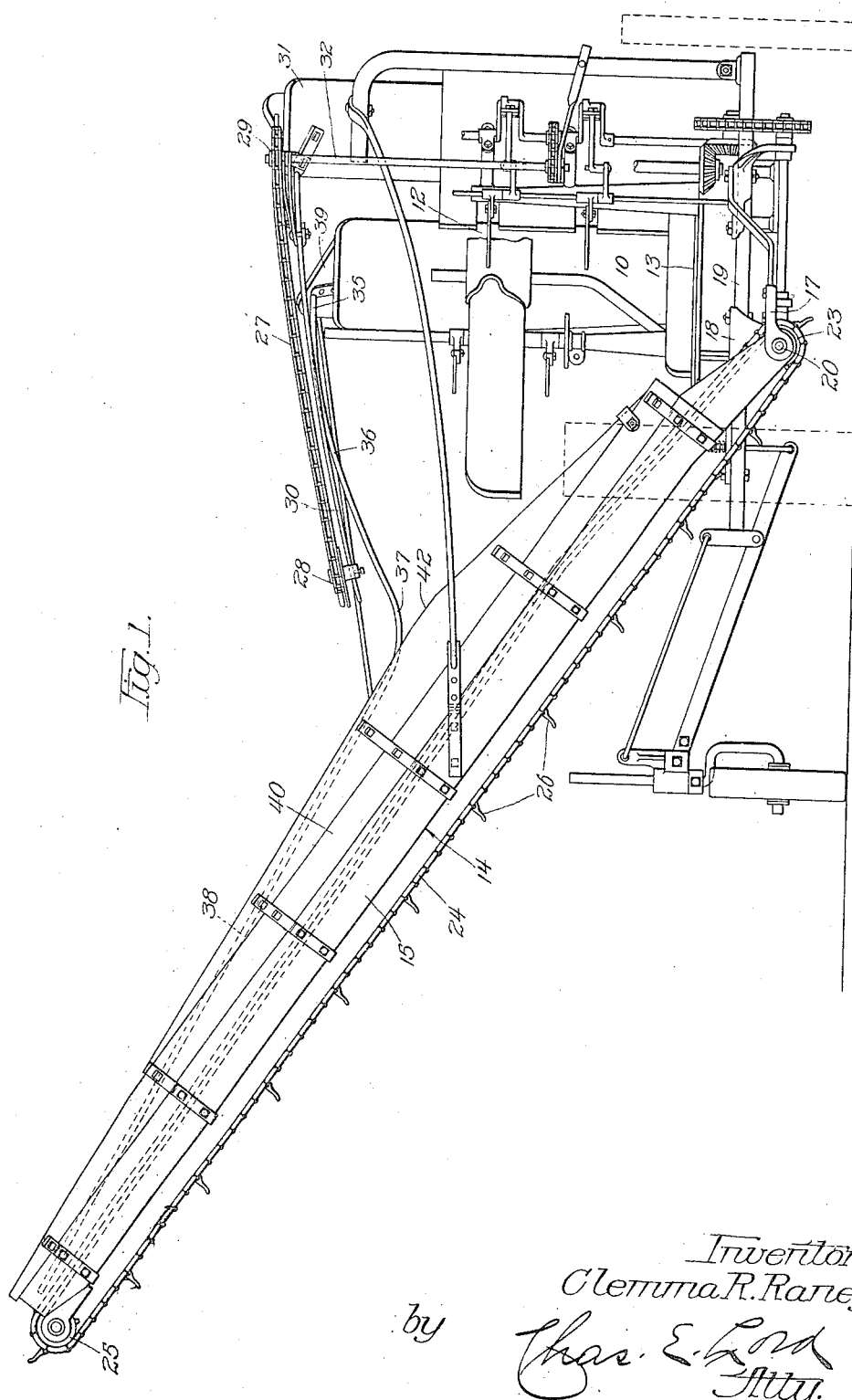

C. R. RANEY.
HARVESTER.
APPLICATION FILED MAY 3, 1915.

1,255,930.

Patented Feb. 12, 1918.
2 SHEETS—SHEET 1.

Inventor:
Clemma R. Raney.
by Chas. E. Lord
Atty.

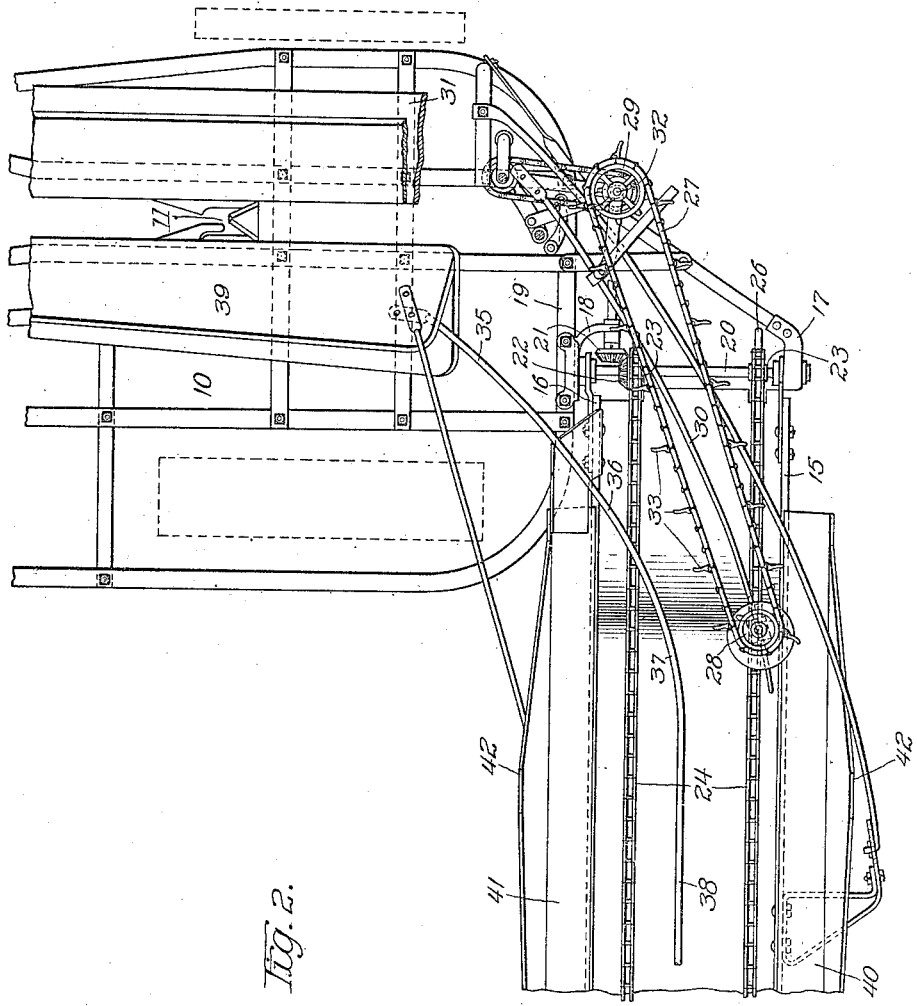

UNITED STATES PATENT OFFICE.

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

HARVESTER.

1,255,930.  Specification of Letters Patent.  Patented Feb. 12, 1918.

Application filed May 3, 1915. Serial No. 25,583.

*To all whom it may concern:*

Be it known that I, CLEMMA R. RANEY, a citizen of the United States, residing at Chicago, in the county of Cook and State of Illinois, have invented certain new and useful Improvements in Harvesters, of which the following is a full, clear, and exact specification.

This invention relates to harvesters, and more particularly to bundle transmitting mechanism associated therewith.

In harvesting grain, such as corn, for example, elevator mechanism is used for receiving bundles from the harvester binding mechanism and conveying the bundles in a manner to drop them into a suitable wagon traveling adjacent the harvester. Under favorable conditions no great difficulty is encountered in conveying the bundles from the binding mechanism to the elevator. Favorable conditions, however, do not always prevail. When the corn stalks are tangled, one part of the stalk may be in one bundle and another part of the same stalk in another bundle. This means that one stalk may bridge two bundles, one of which has been discharged from the binding mechanism and another of which is being bound. Under such conditions the head of the discharged bundle will not move toward the elevator. This results in a clogged condition at the foot of the elevator which seriously affects the operation of the machine. Again, bundles not only need proper conveying and guiding from the binding mechanism to the elevator, but it is necessary to properly guide the bundles throughout the length of the elevator to prevent the bundles from falling therefrom.

Therefore, one of the objects of this invention is to improve the transmission of bundles from the binding mechanism of a harvester to its elevator.

Another object is to properly guide the bundles from the binding mechanism to and on the elevator to meet the requirements for successful commercial operation.

These and other objects are accomplished by providing, in a harvester, means for positively feeding and guiding bundles from the binding mechanism to the elevator and coöperating means for guiding bundles along the elevator.

This invention is illustrated on the accompanying sheets of drawings, in which—

Figure 1 is a rear elevation of a harvester embodying my invention, the elevator and conveying means between the elevator and binding mechanism therefor being shown in side elevation; and Fig. 2 is a plan view of the arrangement disclosed in Fig. 1.

The various novel features of my invention will be apparent from the following description and drawings, and will be particularly pointed out in the appended claims.

I have chosen to illustrate my invention in connection with a corn binder 10, having the usual cutting mechanism 11 and binding mechanism 12, the bundles being bound in a vertical position while standing upon the usual butts chute 13. After the formed bundles are discharged from the binding mechanism, depending upon choice, they are discharged directly to the ground or are elevated for the purpose of placing them into wagons. When elevators are used, they are secured to the rear of the binder in any approved manner. In this particular case an elevator 14, having side members 15 and 16, is secured, by means of said side members, to brackets 17 and 18, which, in turn, are supported by the frame 19 of the binder. Mounted to rotate in the brackets 17 and 18 is a shaft 20, which is driven from any suitable source through intermeshing bevel gears 21 and 22. Mounted upon the shaft 20 are two sprocket wheels 23, over which pass chains 24 which form the movable member of the elevator 14, the chains also passing over suitable sprocket wheels 25 at the upper end of the elevator. These chains are provided with teeth 26 for gripping the bundles when they are deposited thereupon.

Experience has taught that bundles formed by the binding mechanism are not always transmitted from the binding mechanism to the movable element of the elevator in the most efficient manner; that is to say, that under certain unfavorable conditions; for example, when the corn is tangled, the bundles are prevented from passing over into engagement with the elevator in a proper manner, and become clogged at the foot thereof. Primarily, what is meant is this: When corn is badly tangled, one portion of a stalk may be bound in a bundle discharged from the binding mechanism, another portion of the same stalk being bound or fastened in a bundle being formed in the binding mechanism, thus causing a bridging of the two bundles. It is apparent that under such conditions the bundle discharged will not pass freely over to the elevator unless some means is provided for accomplishing the desired result. When such tangled conditions exist it is necessary to cause a separation of the bundles and to positively feed the heads of the discharged bundles away from the vicinity of the binding mechanism toward the elevator, giving the heads of the bundles a pivotal movement with respect to the butt ends of the bundles.

I have chosen to accomplish this result by means of a chain 27, which passes around sprocket wheels 28 and 29, the former being adjustably supported by a rod 30 secured to the grainward gathering board 31, and the latter sprocket wheel 29 being mounted upon one end of a shaft 32 through which rotary movement is transmitted to the sprocket wheels from any suitable driving source. This chain 27, which is interposed between the elevator and the binding mechanism, and being located above the latter, is positioned in a manner such that the teeth 33 of the chain engage the heads of the bundles immediately upon their discharge from the binding mechanism to positively feed the heads thereof away from the binding mechanism, giving the heads a pivotal movement about the butt ends and placing said bundles onto the movable member or conveyer 24 of the elevator with the head ends forward. A rod 35, having a rearwardly, stubblewardly and downwardly extending portion 36, presses the bundles into and maintains them in engagement with the oppositely arranged chain 27, thereby guiding and otherwise assisting in the transmission of the bundles from the binding mechanism to the elevator. This rod 35 has a curved portion 37, and also another portion 38 which extends upwardly over the middle portion of the conveyer chains 24, said portion 38 gradually approaching the floor of the conveyer as it nears the top of the elevator. This rod 35, which is suitably supported, being secured to the stubbleward gathering board 39, has a coöperative action not only in guiding and assisting the feeding chain 27 in transmitting bundles from the binding mechanism to the elevator, but the portion 38 of the rod also acts in a manner to guide bundles in their movement upwardly of the elevator. The bundles pass under the rod 35 at the curved portion 37 thereof, and as the bundles are fed upwardly the rod 38 gradually sinks into or between the stalks of a bundle and in this manner tends to cause the bundles to follow the direction of the portion 38 of the rod 35.

In this connection I desire to call attention to the fact that the sides of the elevator have been so designed as to assist in a guiding movement of the bundles to prevent the bundles from falling off the elevator under extreme adverse conditions. It will be noted that the upper parts of the sides have flaring portions 40 and 41, the flaring portions being greatest at points 42, the flare gradually decreasing toward the upper end of the elevator, and the height of the sides relative to the floor of the elevator also gradually decreasing toward the upper end thereof. By means of this design the head of a bundle which may hang over one of the flaring side portions will have a tendency to fall down between the side portions into more intimate contact with the conveyer chains as the bundle is being conveyed upwardly. This is true for the reason that the flaring portions are directed toward the middle of the elevator and the downward slope of the sides with respect to the floor of the elevator from the points 42 to the free end of said elevator.

By means of this arrangement a bundle of corn, which is discharged from the binding mechanism, may be positively fed and guided from the binding mechanism, regardless of tangled conditions, direct to the elevator, whereupon the bundle passes under the curved portion 37 of the rod 35 and is guided in its upward movement under the portion 38 of rod 35, with the flaring sides and their decreasing height toward the free end assisting in guiding the bundle throughout the length of the elevator to the point where the bundle is discharged therefrom.

Other means for positively feeding bundles from the binding mechanism to the elevator may be used; also other guiding means may be chosen for the desired purpose. It is evident that various other modifications may be made in the precise arrangement herein shown and described, and it is my intention to cover all such modifications which do not involve a departure from the spirit and scope of my invention as set forth in the appended claims.

What I claim as new is:—

1. In a harvester, binding mechanism, an elevator, and means independent of the binding mechanism of the harvester for engaging a bundle, separating it from the succeeding bundle and feeding the same to said elevator.

2. In a harvester, binding mechanism, an elevator, and means intermediate said binding mechanism and elevator for engaging a bundle, separating it from the succeeding bundle and feeding the same to said elevator.

3. In a harvester, an elevator, means for engaging the head of a bundle, separating the same from the succeeding bundle and feeding the same to the elevator, and means for guiding the bundle in its movement to said elevator.

4. In a harvester, binding mechanism, an elevator, and means overlapping the binding mechanism for positively withdrawing the head of a bundle from the binding mechanism and for feeding it to said elevator.

5. In a harvester, binding mechanism, an elevator, and oppositely arranged means located between said binding mechanism and said elevator for engaging a bundle, separating it from the succeeding bundle and feeding the bundle to said elevator.

6. In a harvester, an elevator, and movable means for withdrawing bundles from the binding mechanism of the harvester and maintaining engagement with bundles to transmit them from the binding mechanism to the elevator.

7. In a harvester, binding mechanism, an elevator, and a chain for positively withdrawing bundles directly from the binding mechanism and transmitting them from the binding mechanism to the elevator.

8. In a harvester, binding mechanism, an elevator, and single means for engaging the head of a bundle, giving the head a pivotal movement about its butt end, and feeding the bundle from the binding mechanism to said elevator.

9. In a harvester, binding mechanism, an elevator, and means intermediate said mechanism and elevator for withdrawing a bundle from the binding mechanism and swinging it between the binding mechanism and elevator.

10. In a harvester, an elevator, means for engaging the head of a bundle for feeding the bundle to said elevator, and means for guiding the bundle to said elevator and for compressing the bundle in its movement on said elevator.

11. In a harvester, an elevator, means for engaging the head of a bundle for feeding the bundle to said elevator, and means for guiding the bundle in its movement to said elevator and having a portion located over the movable element of said elevator for compressing the bundle in its movement on the elevator.

12. In a harvester, an elevator, and a chain for engaging the head of a bundle for giving it a swinging movement into said elevator while the butt is substantially stationary.

13. In a harvester, a support, a sprocket wheel adjustably mounted on said support, and a single elevated actuated chain passing over said sprocket wheel for engaging the head of a bundle for giving it a swinging movement in passing from the harvester.

14. In a harvester, binding mechanism, an elevator having a movable element and a stationary element with flaring side portions tapered inwardly toward the body of the elevator as the side portions approach the delivery end of the elevator and throughout the major portion of the length thereof, and means for withdrawing bundles from said binding mechanism and feeding them to said elevator, said flaring side portions of the elevator tending to guide the bundles toward the middle of the elevator in their upward movement.

15. In a harvester, binding mechanism, an elevator having a movable element and a stationary element with flaring side portions, means for feeding bundles from said binding mechanism to said elevator, and a rod extending over said elevator coöperating with said flaring side portions for guiding the bundles in their movement.

16. In a harvester, binding mechanism, an elevator having a movable element and a stationary element with a flaring side portion, a chain for feeding bundles from said binding mechanism to said elevator, and a member extending over said elevator coöperating with said flaring side portion for positively guiding the bundles.

In testimony whereof I affix my signature, in the presence of two witnesses.

CLEMMA R. RANEY.

Witnesses:
RAY D. LEE,
PAUL KANE.

Copies of this patent may be obtained for five cents each, by addressing the "Commissioner of Patents, Washington, D. C."